United States Patent
Liu et al.

(10) Patent No.: US 12,354,571 B2
(45) Date of Patent: Jul. 8, 2025

(54) PROCESSING METHOD AND DEVICE

(71) Applicant: Lenovo (Beijing) Limited, Beijing (CN)

(72) Inventors: Yuhuang Liu, Beijing (CN); Meng Luo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/240,677

(22) Filed: Aug. 31, 2023

(65) Prior Publication Data

US 2024/0071338 A1    Feb. 29, 2024

(30) Foreign Application Priority Data

Aug. 31, 2022    (CN) .................... 202211061801.X (51) Int. Cl.
*G09G 5/391*    (2006.01)
*G06F 3/14*    (2006.01)
*G09G 5/00*    (2006.01)

(52) U.S. Cl.
CPC ........... *G09G 5/391* (2013.01); *G06F 3/1454* (2013.01); *G09G 5/005* (2013.01); *G09G 2340/0407* (2013.01)

(58) Field of Classification Search
CPC ................ G09G 5/005; G09G 5/391; G09G 2340/0407; G06F 3/1454; G06F 3/1462; G06F 3/147
See application file for complete search history.

(56) References Cited

U.S. PATENT DOCUMENTS

2022/0100300 A1\* 3/2022 Lohrmann .......... G06F 3/04847
2022/0398691 A1\* 12/2022 Wei ........................ G09G 5/391

\* cited by examiner

*Primary Examiner* — Dennis P Joseph
(74) *Attorney, Agent, or Firm* — ANOVA LAW GROUP, PLLC (57) ABSTRACT

A processing method includes obtaining a first screen resolution of a first electronic device and a second screen resolution of a second electronic device, the first electronic device being a sender of shared data, and second electronic device being a recipient of the shared data; determining a first display attribute of a display object in display content displayed by the first electronic device, the first display attribute being at least used to characterize display size displayed by the display object; determining a target display parameter based on the first screen resolution, the second screen resolution, and the first display attribute, the target display parameter being a display parameter needed for the second electronic device to display the display object with the target display attribute; adjusting display effect of the display content based on the target display parameter; and sending the display content after adjusting the display effect to the second electronic device as the shared data.

18 Claims, 6 Drawing Sheets

PROCESSING METHOD AND DEVICE

CROSS-REFERENCES TO RELATED APPLICATION

This application claims priority to Chinese Patent Application No. 202211061801.X filed on Aug. 31, 2022, the entire content of which is incorporated herein by reference.

FIELD OF TECHNOLOGY

The present disclosure relates to a processing method and device.

BACKGROUND

With the continuous development of communication technology, there are more and more ways to share screen content between electronic devices. For example, in a video conference between a plurality of electronic devices, the screen content can be shared between the plurality of electronic devices.

However, the screen resolutions of different electronic devices may be different. If an electronic device A with a relatively high screen resolution shares the screen content M of the electronic device A with an electronic device B with a relatively low screen resolution, since the screen pixel density of the electronic device B is relatively low, the screen content M of the electronic device A displayed by the electronic device B will be blurry.

SUMMARY

In accordance with the disclosure, there is provided a processing method. The processing method includes obtaining a first screen resolution of a first electronic device and a second screen resolution of a second electronic device, the first electronic device being a sender of shared data, and second electronic device being a recipient of the shared data; determining a first display attribute of a display object in display content displayed by the first electronic device, the first display attribute being at least used to characterize display size displayed by the display object; determining a target display parameter based on the first screen resolution, the second screen resolution, and the first display attribute, the target display parameter being a display parameter needed for the second electronic device to display the display object with the target display attribute; adjusting display effect of the display content based on the target display parameter; and sending the display content after adjusting the display effect to the second electronic device as the shared data.

Also in accordance with the disclosure, there is provided a processing device. The processing device includes a resolution acquisition unit, the resolution acquisition unit being configured to obtain a first screen resolution of a first electronic device and a second screen resolution of a second electronic device, the first electronic device being a sender of shared data, and the second electronic device being a recipient of the shared data; an attribute determination unit, the attribute determination unit being configured to determine a first display attribute of a display object in display content displayed by the first electronic device, the first display attribute being at least used to characterize display size displayed by the display object; a parameter determination unit, the parameter determination unit being configured to determine a target display parameter based on the first screen resolution, the second screen resolution, and the first display attribute, the target display parameter being a display parameter needed for the second electronic device to display the display object with a target display attribute; a content adjustment unit, the content adjustment unit being configured to adjust display effect of the display content based on the target display parameter for the display object in the display content to include the target display attribute; and a content sharing unit, the content sharing unit being configured to send the display content after adjusting the display effect to the second electronic device as the shared data.

Also in accordance with the disclosure, there is provided a non-transitory computer-readable storage medium containing computer-executable instructions that, when executed by a processor, cause the processor to obtain a first screen resolution of a first electronic device and a second screen resolution of a second electronic device, the first electronic device being a sender of shared data, and second electronic device being a recipient of the shared data; determine a first display attribute of a display object in display content displayed by the first electronic device, the first display attribute being at least used to characterize display size displayed by the display object; determine a target display parameter based on the first screen resolution, the second screen resolution, and the first display attribute, the target display parameter being a display parameter needed for the second electronic device to display the display object with the target display attribute; adjust display effect of the display content based on the target display parameter; and send the display content after adjusting the display effect to the second electronic device as the shared data.

BRIEF DESCRIPTION OF THE DRAWINGS

In order to illustrate the technical solutions in accordance with embodiments of the present disclosure more clearly, the accompanying drawings to be used for describing the embodiments are introduced briefly in the following. The accompanying drawings in the following description are only some embodiments of the present disclosure. Those of ordinary skill in the art can obtain other accompanying drawings in accordance with the accompanying drawings without any creative efforts.

DETAILED DESCRIPTION

The technical solutions of embodiments of the present disclosure are applicable to scenarios where the display content is shared between electronic devices, such as sharing the screen or a part of the display content on the screen in a video conference, or other scenarios involving display content sharing, which is not limited in embodiments of the present disclosure.

Embodiments of the present disclosure are described in detail below with reference to the accompanying drawings. The described embodiments are some rather than all of the embodiments of the present disclosure. Other embodiments obtained by those of ordinary skill in the art on the basis of the described embodiments without inventive efforts should fall within the scope of the present disclosure.

Figure 1:
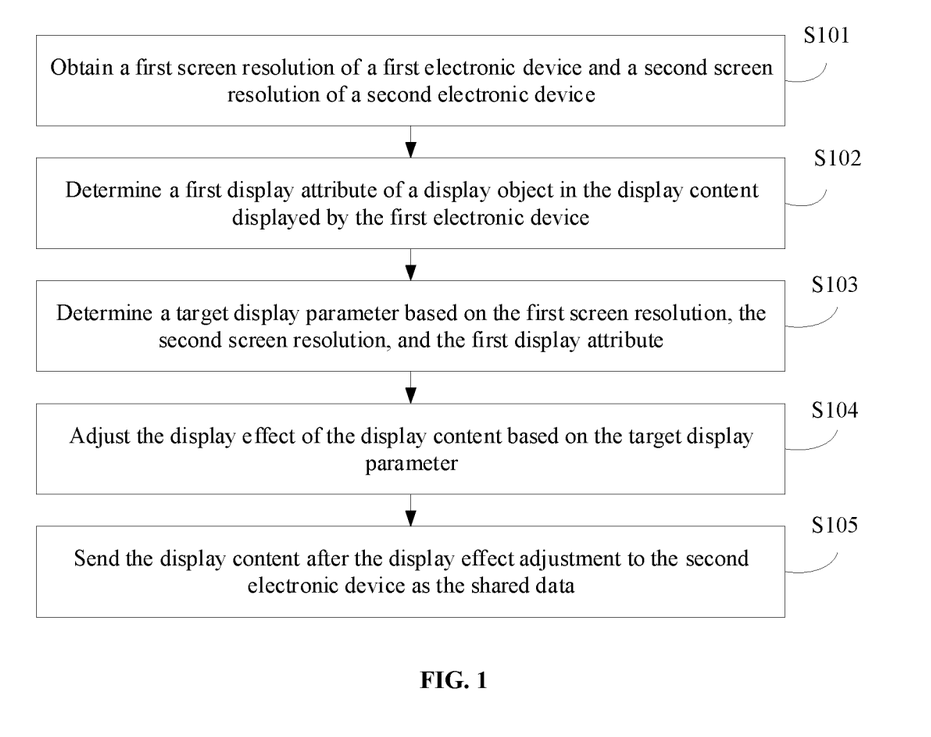
FIG. 1 is a schematic flowchart of a processing method according to an embodiment of the present disclosure.
Figure 7:
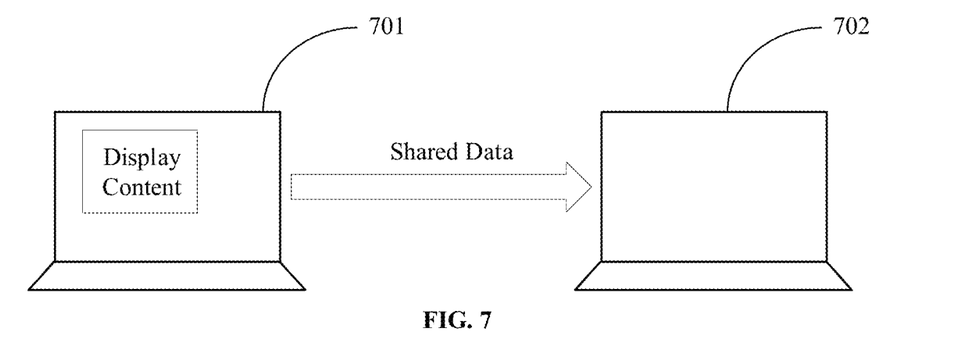
FIG. 7 is a schematic diagram showing an application scene of the method according to an embodiment of the present disclosure.

FIG. 1 is a schematic flowchart of a processing method according to an embodiment of the present disclosure. The processing method of embodiments of the present disclosure may be applied to a first electronic device (such as first electronic device 701 shown in FIG. 7) as a sender of shared data. The method is described in detail below.

At S101, obtaining a first screen resolution of a first electronic device and a second screen resolution of a second electronic device.

As described above, the first electronic device may be the sender of the shared data, that is, an initiator who initiates data sharing. Correspondingly, the second electronic device (such as second electronic device 702 shown in FIG. 7) may be the recipient of the shared data, that is, the electronic device selected by the first electronic device as the recipient of the shared data.

For the convenience of distinction, the screen resolution of the first electronic device is referred to as the first screen resolution, and the screen resolution of the second electronic device is referred to as the second screen resolution.

In some embodiments, the first screen resolution may be the screen resolution currently set on the first electronic device, and the second screen resolution may be the screen resolution currently set on the second electronic device.

Considering that the lower the screen resolution of the second electronic device is, the blurrier the display content shared by the first electronic device will be, therefore, in order to improve the clarity of the shared content displayed by the second electronic device, in embodiments of the present disclosure, the highest screen resolution of the second electronic device may be obtained. The highest screen resolution of the second electronic device may be determined as the second screen resolution. Correspondingly, both the subsequent calculation and the display of the shared content by the second electronic device can be performed on the basis of the highest screen resolution.

Further, in order to ensure that the adjusted display content can be clearly displayed on the second electronic device, in embodiments of the present disclosure, the subsequent calculation may also be performed based on the case where the screen resolution of the first electronic device is the highest screen resolution of the first electronic device. In this way, the first screen resolution may also be the highest screen resolution of the first electronic device.

At S102, determining a first display attribute of a display object in the display content displayed by the first electronic device.

In some embodiments, the display content displayed by the first electronic device may be content that needs to be shared by the first electronic device.

The display content may be part or all of the content displayed on the display unit on the first electronic device, which is not limited in embodiments of the present disclosure.

For example, the display content may be all screen content displayed in the display unit; the display content may also be the display content in the display window belonging to a designated application in the display unit; or the display content may also be the display content in a specific area.

The display object may be the object included in the display content. In the embodiments of the present disclosure, the display object may be any type of object in the display content. For example, the display objected may be an object such as a character, an item, a person, or an icon included in the display content.

In some embodiments, the display attribute of the display object may be at least used to characterize the display size displayed by the display object. The display attribute may also include attribute information related to display feature such as the display position of the display object relative to the display content, which is not limited in embodiments of the present disclosure.

For example, if the display object is a character such as text in the display content, then the first display attribute of the character may include the font size of the character, and the size of the character may be indicated by the font size of the character.

In another example, if the display object is an object such as an icon or an item other than characters in the display content, then the first display attribute of the display object may be the height, width, height ratio, or width ratio of the display object in the display content.

For the convenience of distinction, the display attribute currently possessed by the display object in the display content being displayed by the first electronic device may be referred to as the first display attribute.

There are many ways to obtain the first display attribute of the display object in the display content, which is not limited in embodiments of the present disclosure. For example, an image of the display object may be used to analyze the image to determine the display attribute of the display object in the display content.

A plurality of objects may be included in the display content. In this case, in embodiments of the present disclosure, the first display attribute of the display object of a specific object type may be obtained.

If a plurality of objects of the specific object type are included in the display content, the object with the most objects or the largest coverage area in the display content that belongs to the specific object type may be determined as the display object.

In embodiments of the present disclosure, the first display attributes of various display objects may also be obtained, and the display attributes may be synthesized based on the first display attributes corresponding to the various display objects as the final first display attribute.

In some embodiments, when the first electronic device includes or is connected to a plurality of displays, for example, when the first electronic device is configured to control not only the screen of the first electronic device but also an extension screen connected to the first electronic device, the target display that needs to share the display content may be selected or set by the user. Subsequently, the first display attribute of the display object in the display content displayed by the target display may be determined.

At S103, determining a target display parameter based on the first screen resolution, the second screen resolution, and the first display attribute.

In some embodiments, the target display parameter may be a display parameter needed to enable the second electronic device to present the display object having a target display attribute.

In some embodiments, the target display attributes may be a parameter related to the display screen of the display.

For example, in embodiments of the present disclosure, the target display parameter may at least include a target increase in dots per inch (DPI). In some embodiments, the target display may also include a display parameter such as the screen resolution, which is not limited in the embodiments of the present disclosure.

In some embodiments, the target display attribute may be set in advance. After the second electronic device outputs the display content, and the display attribute needed by the display object may be obtained. The target display attribute may be set on the basis that the second electronic device can clearly display the target object.

When the screen resolution of the second electronic device is fixed, the larger the target object is, the clearer the target object will be displayed by the second electronic device, and the possibility of the user being unable to see the target object will reduce. Based on the this, the target display attribute can be at least used to characterize the needed target display size of the target object being displayed on the second electronic device.

The target attribute information may also include other display feature information such as the target display position of the target object, which is not limited in embodiments of the present disclosure.

At S104, adjusting the display effect of the display content based on the target display parameter.

In embodiments of the present disclosure, the purpose of adjusting the display content based on the target display parameter is to adjust the display effect of the display content displayed under the target display parameter. In this way, after the adjusted display content is displayed on the second electronic device, the display object in the display content displayed by the second electronic device can include the target display attribute.

For example, the display effect of the display content may be adjusted based on the target display parameter such that the display object in the display content may have the target display size corresponding to the target display attribute, thereby reducing the blurriness of the target display object due to the target display object being too small and the resolution of the second electronic device being too low.

A plurality of implementations of adjusting the display effect of the display content based on the target display parameter may exist. The following are some possible scenarios.

In some embodiments, the display parameter of the first electronic device may be adjusted based on the target display parameter to adjust the display effect of the display content.

In some embodiments, the display content may not be directly adjusted, but the corresponding display parameters in the first electronic device may be adjusted based on the target display parameter. However, due to the adjustment of the display parameters of the first electronic device, the display effect of the display content displayed by the first electronic device will change, thereby changing the display attribute of the display object.

In some embodiments, the data of the display content does not need to be adjusted, and only the display parameters of the first electronic device need to be adjusted, the complexity is relatively low.

In other embodiments, the display content may be adjusted to the display effect under the target display parameter, and the display content after the display effect is adjusted may be obtained.

In some embodiments, the data of the display content may be adjusted. The specific adjustment method may include simulating the display effect of the display content when the display parameter of the first electronic device is adjusted to the target display parameter, and obtaining the display content with the display effect.

In some embodiments, since the display parameter of the first electronic device is not adjusted, the display content displayed by the first electronic device does not change. In addition, the process does not involve outputting the adjusted display content output on the first electronic device. Therefore, the user of the sender of the shared data will not perceive the change of the display content.

At S105, sending the display content after the display effect adjustment to the second electronic device as the shared data.

For example, the display content after the display effect adjustment may be sent to the second electronic device as the screen sharing content shared by the first electronic device or other forms of shared data.

Since the target display parameter based on which the display effect of the display content is adjusted is determined based on the target display attribute need to make the second electronic device display the display object, after the second electronic device obtains and displays the adjusted display content, the user on the second electronic device sees that the display attribute of the display object in the display content is the target display attribute, instead of the first display attribute.

Therefore, by reasonably setting the target display attribute that can meet the display requirements of the second electronic device, the situation that the second electronic device cannot clearly display the display object in the shared data can be mitigated.

For example, when the screen resolution of the electronic device is fixed, considering that when the user views the content displayed by the electronic device, the larger the object in the display content, the clearer the user will see. Therefore, in embodiments of the present disclosure, by reasonably setting the needed target display size of the display object in the target display attribute, the situation of displaying blurry display object on the second electronic device can be reduced.

In embodiments of the present disclosure, the first electronic device as the sender of the shared data can obtain the first screen resolution of the first electronic device and the second screen resolution of the second electronic device as the recipient of the shared data. In addition, the first electronic device can be configured to determine the target display parameter needed to enable the second electronic device to display the display object with the target display attribute based on the first screen resolution, the second screen resolution, and the first display attribute of the display object in the displayed display content. Therefore, after adjusting the display effect of the display content based on the target display parameter, after the display content is displayed on the second electronic device, the display object in the display content can include the target display attribute.

Based on this, after the adjusted display content is shared with the second electronic device as the shared content, the display object in the display content displayed by the second electronic device can also have the target display attribute. Thus, by setting the target display attribute, the display size of the display object in the shared content displayed by the second electronic device can be adjusted, and the blurriness of the shared content due to the relatively low screen resolution of the second electronic device can be reduced.

When the screen resolution of the second electronic device serving as the recipient of the shared data is lower than the screen resolution of the first electronic device, if the display content shared by the first electronic device is output to the second electronic device, the display object in the display content displayed by the second electronic device is blurry, in order to make the display object displayed by the second electronic device clear to the user, the display object may be enlarged.

The process of manually zooming the display content to enlarge the display object on the first electronic device or the second electronic device side is relatively complex. However, if the increase range of DPI of the first electronic device is adjusted, the display content displayed on the first electronic device and the display object included therein may be enlarged. In this way, by sending the display content of the enlarged display object to the second electronic device, the blurriness of the display object displayed by the second electronic device can be reduced. Based on this, in embodiments of the present disclosure, the determined target display attribute may include a target increase range of DPI of the first electronic device.

If the screen resolution of the second electronic device is higher than the screen resolution of the first electronic device, when the display object can be clearly displayed on the first electronic device, after the display content including the display object is shared with the second electronic device, the display object may also be clearly displayed on the second electronic device. In addition, since the content displayed by the first electronic device at different times may change, and the display attribute of the display object in the display content displayed at different times may also be different, even if the screen resolution of the second electronic device is lower than the screen resolution of the first electronic device, the second electronic device may also clearly display the display content shared by the first electronic device.

Figure 2:
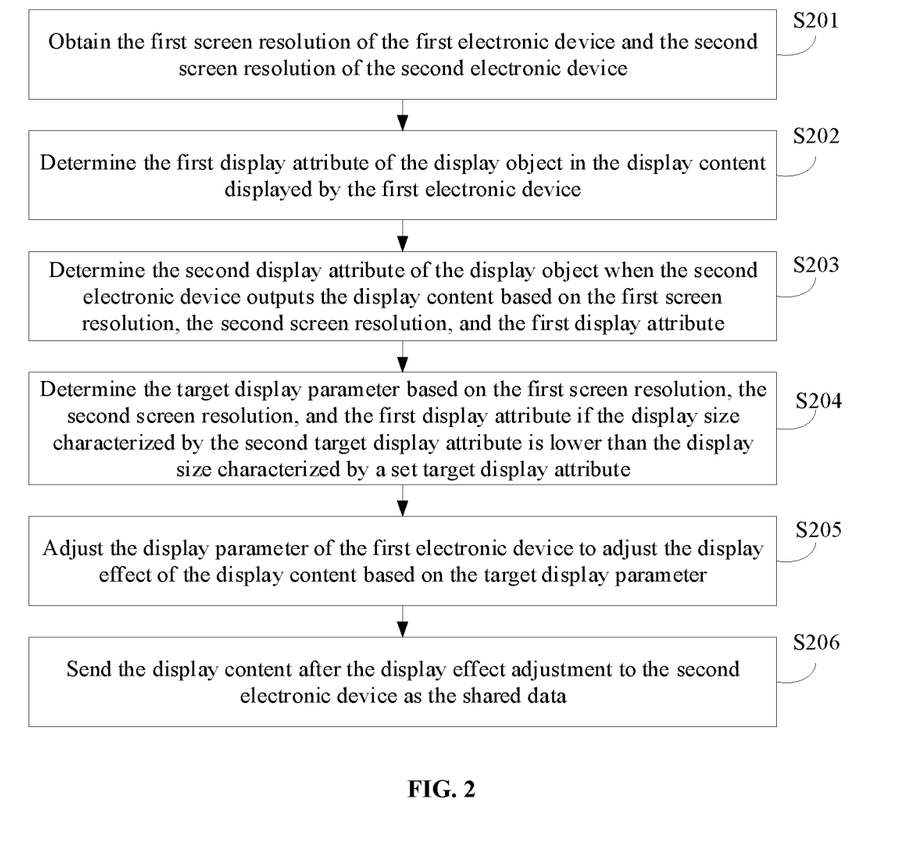
FIG. 2 is another schematic flowchart of the processing method according to an embodiment of the present disclosure.

Based on this, in order to reduce the amount of data, before the first electronic device shares data with the second electronic device, the first electronic device may be configured to determine whether the second electronic device can clearly display the to-be-shared content. FIG. 2 is another schematic flowchart of the processing method according to an embodiment of the present disclosure. The processing method can be applied to the first electronic device described above. The method will be described in detail below.

At S201, obtaining the first screen resolution of the first electronic device and the second screen resolution of the second electronic device.

As described above, the first screen resolution may be the current resolution of the first electronic device, or the highest screen resolution of the first electronic device. The first screen resolution may also include the current screen resolution and the highest screen resolution of the first electronic device at the same time.

Similarly, the second screen resolution of the second electronic device may be at least one of the current screen resolution of the second electronic device and the highest screen resolution supported by the second electronic device.

At S202, determining the first display attribute of the display object in the display content displayed by the first electronic device.

The first display attribute of the display object may be at least used to characterize the display size displayed by the display object in the display content currently being displayed by the first electronic device.

At S203, determining the second display attribute of the display object when the second electronic device outputs the display content based on the first screen resolution, the second screen resolution, and the first display attribute.

The second display attribute may that after the display content including the display object with the first display attribute is sent to the display object, and after the second electronic device displays the display content, the display attribute of the display object displayed by the second electronic device.

In some embodiments, the second display attribute may at least characterize the display size of the display object displayed by the second electronic device.

Determining the second display attribute is not sending the current display content to the second electronic device for display, and then determining the display attribute of the display object displayed on the second electronic device. Instead, based on the determined first screen resolution, the second screen resolution, and the second display attribute, the display size of the display object in the display content may be calculated, simulated, or estimated when the second electronic device displays the display content.

In some embodiments, determining the second display attribute may include deriving the second display attribute of the display object at the second screen resolution in combination with the first display attribute of the display object at the first screen resolution. In the specific derivation process, the second display attribute may be determined in combination with the conversion relationship between display attributes under different screen resolutions. The conversion relationship may be different depending on the display attribute, which is not limited in the embodiments of the present disclosure.

At S204, determining the target display parameter based on the first screen resolution, the second screen resolution, and the first display attribute if the display size characterized by the second target display attribute is lower than the display size characterized by a set target display attribute.

In some embodiments, the target display attribute may be set in advance, and the target display attribute may be the display attribute needed by the display object being displayed on the second electronic device. In some embodiments, the target display attribute may be the target display attribute needed by the display object on the premise that the second electronic device can clearly display the display object.

The target display attribute may at least characterize the target display size of the display object being displayed on the second electronic device. The target display size may be the minimum display size needed to enable the second electronic device to clearly display the display object.

In some embodiments, the target display parameter may be a display parameter needed to enable the second electronic device to display a display object having the target display attribute.

If the display size of the display characterized by the second display attribute being displayed on the second electronic device is smaller than the display size characterized by the set target display attribute, the current display content is shared with the second electronic device, and after the second electronic device displays the display content, the display object in the display content may be blurry. Thus, the display content needs to be adjusted such that the display object in the display content finally shared to the second electronic device can be clearly displayed.

In some embodiments, when the display content is determined, the higher the screen resolution of the electronic device, the higher the definition of objects in the display content displayed by the electronic device will be. Based on this, in the embodiments of the present disclosure, the second screen resolution may be the highest screen resolution of the second electronic device. Correspondingly, if the second display attribute is calculated based on the highest screen resolution of the second electronic device, the display size characterized by the second electronic device is smaller than the display size characterized by the set target display attribute, then it can be confirmed that the second electronic device cannot clearly display the target object in the target content.

Similarly, when calculating the second target display attribute, the highest screen resolution of the first electronic device may also be used.

Further, when determining the target display parameter, the second screen resolution may also use the highest screen resolution of the second electronic device to reduce the situation where the calculated target display parameter exceeds the highest range of display parameter that can be set by the first electronic device, or to reduce the situation where the second electronic device cannot clearly display the display object after the target display parameter exceeds the highest range of the display parameter that can be set. The first screen resolution may also use the highest screen resolution of the first electronic device.

In some embodiments, the target display parameter may be first determined based on the current screen resolution of the second electronic device and the current screen resolution of the first electronic device. If the value of the target display parameter exceeds the highest value of the display parameter that can be set on the first electronic device, then the target display parameter may be determined based on information such as the highest screen resolution of the second electronic device and the highest screen resolution of the first electronic device (or the current screen resolution of the first electronic device).

If the display size characterized by the second target display attribute is not smaller than the display size characterized by the set target display attribute, then it may indicate that after the display content currently being displayed on the first electronic device is shared with the first electronic device, the first electronic device can clearly display the display object in the display content. In this way, the display content current being displayed by the first electronic device may be directly sent to the second electronic device as the shared data.

At S205, adjusting the display parameter of the first electronic device to adjust the display effect of the display content based on the target display parameter.

As described above, the target display parameter may include a target increase range of DPI of the first electronic device. In some embodiments, the increase range of DPI in the first electronic device may be set as the target increase range.

Of course, if the target increase range of DPI of the first electronic device exceeds the maximum increase range of DPI that can be set in the first electronic device, then the increase range of DPI of the first electronic device may be set as the maximum increase range. In some embodiments, if the increase range of DPI set by the first electronic device is greater than the determined target increase range, then the current increase range of DPI set by the first electronic device may remain unchanged.

In some embodiments, if the highest screen resolution of the first electronic device is used when calculating the target display parameter, then the determined target display parameter may also include the highest screen resolution of the first electronic device. In this case, if the current screen resolution of the first electronic device is not the first screen resolution, the first electronic device may set its screen resolution to the highest screen resolution.

For ease of understanding, in some embodiments, adjusting the target display content by adjusting the display parameter of the first electronic device is described as an example. However, other methods for adjusting the display effect of the display content mentioned above are also applicable to this embodiment. For example, based on the display content currently being displayed by the electronic device, the display content that matches the display effect when the DPI increase range of the first electronic device is the target increase range may be generated to obtain the display content after the displayed effect is adjusted.

At S206, sending the display content after the display effect adjustment to the second electronic device as the shared data.

For the detailed description of the process at S206, reference can be made to the relevant description in the foregoing embodiments, which will not be repeated here.

When calculating the target display parameter based on the highest screen resolution of the second electronic device, if the screen resolution of the second electronic device is set to the highest screen resolution, when the second electronic device displays the display content after the display effect is adjusted, the display object being displayed may still not reach the target display attribute.

Based on this, when calculating the target display parameter based on the highest screen resolution of the second electronic device, the first electronic device may also instruct the second electronic device to set the screen resolution of the second electronic device to the highest screen resolution corresponding to the second electronic device. In this way, the adjusted display content can be displayed on the second electronic device at its highest screen resolution, such that he displayed display object can include the target display attribute, thereby reducing the blurry display of the display object.

The display content can include a plurality of possibilities for displaying objects in the display content.

However, when the screen resolution changes, the display clarity of various characters in the display content is most affected, while impact on pictures or other images other than characters is relatively small, or even negligible.

At the same time, in screen sharing or other scenarios where data needs to be shared, the shared data generally includes characters. Therefore, the present disclosure takes the display object as a character as an example for illustration.

In embodiments of the present disclosure, a character may be a Chinese character, a letter, a symbol, etc., which is not limited in the embodiments of the present disclosure.

For the display object of a character, the display attribute of the character may include information such as font size, display position, and font of the character. The font size of the character can affect the display clarity of the character the most. For example, under the same screen resolution, the larger the font size of the character, the clearer the character can be seen by the user after the electronic device displays the character, and possibility of blurriness is reduced. At the same time, other display attribute information has relatively little influence on the character clarity, and it is difficult to change other display attributes.

Based on this, for the display object of a character, the target display attribute of the character in the present disclosure may be the font size of the character. Correspondingly, the target display attribute may be determined based on the first screen resolution of the first electronic device, the second screen resolution of the second electronic device, and the font size of the character.

For example, the target increase range of the dots per inch of the first electronic device may be determined based on the first screen resolution, the second screen resolution, and the font size.

In the following, the technical solution of the present disclosure will be described by taking the display object as a character and the target display parameter as the target increase range of DPI as an example.

Figure 3:
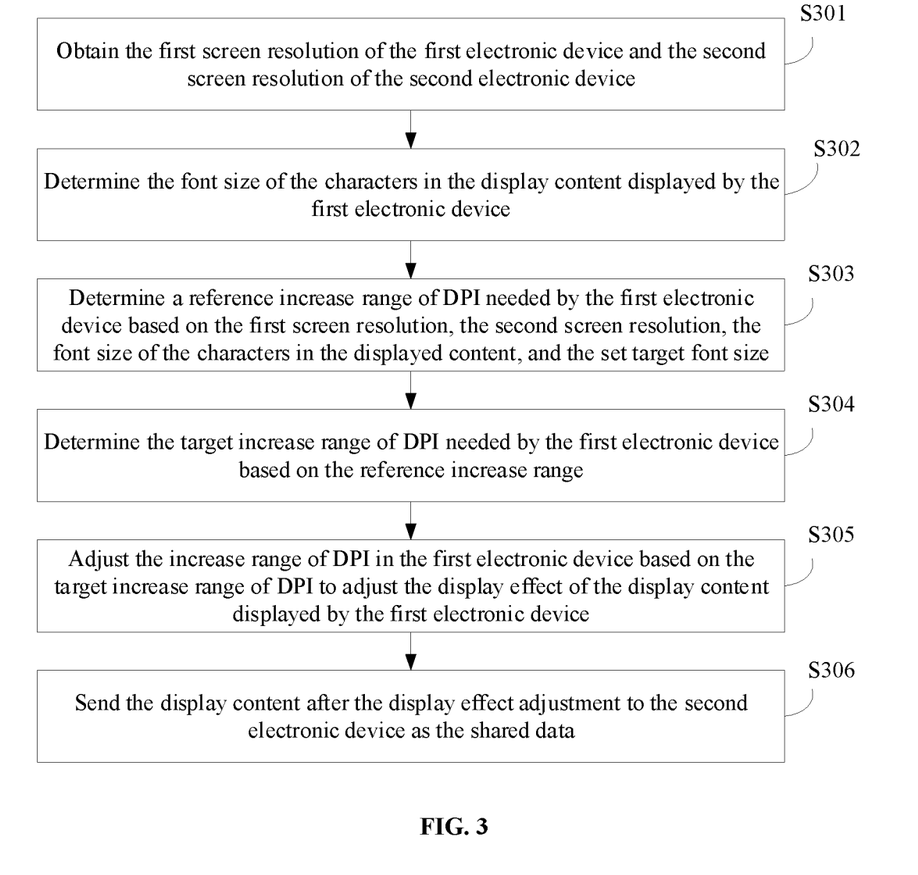
FIG. 3 is another schematic flowchart of the processing method according to an embodiment of the present disclosure.

FIG. 3 is another schematic flowchart of the processing method according to an embodiment of the present disclosure. The processing method can be applied to the first electronic device. The method will be described in detail below.

At S301, obtaining the first screen resolution of the first electronic device and the second screen resolution of the second electronic device.

In some embodiments, the first electronic device may be the sender of the shared data, and the second electronic device may be the recipient of the shared data.

As described above, the first screen resolution may be the current screen resolution of the first electronic device, or the highest screen resolution of the first electronic device. The second screen resolution may also be the current screen resolution of the second electronic device, or the highest screen resolution of the second electronic device.

Step S301 is described in the foregoing embodiments. For details, reference can be made to the relevant description in the foregoing embodiments, which will not be repeated here.

At S302, determining the font size of the characters in the display content displayed by the first electronic device.

In some embodiments, the font size of the characters can visually represent the size of the characters.

For example, if the font size of character A displayed on the same electronic device is 8 points, and the font size of character B is 10 points, then character A is smaller than character B.

The font size of the displayed characters can be determined from the display content displayed by the electronic device in a plurality of methods, which are not limited in embodiments of the present disclosure. In some embodiments, the characters of the displayed content may be recognized through the OCR technology to obtain the font size of the recognized characters.

Similar to the foregoing embodiments, if there are multiple characters with different font sizes in the display content, then the font size that appears most in the display content may be used as the font size of the characters in the display content. Alternatively, the font size corresponding to a character of a font size occupying the largest area of the display content may be used as the font size of the characters in the display content, which is not limited in the embodiments of the present disclosure.

At S303, determining a reference increase range of DPI needed by the first electronic device based on the first screen resolution, the second screen resolution, the font size of the characters in the displayed content, and the set target font size.

In some embodiments, the target font size may be the font size needed by the electronic device to clearly display characters, for example, the target font size may be the smallest font size that the electronic device can clearly display characters.

When the font size of the characters displayed on the electronic device is less than 8 points, the user may not be able to read the characters clearly. Based on this, the target font size may be set to 8 points.

In some embodiments, the reference increase range may be the increase range of dots per inch needed for the second electronic device to display the characters in the display content at a font size no lower than the target font size.

When the display content is fixed and the screen resolution is determined, the greater the increase in DPI, the larger the characters in the final displayed content will be. Based on this, in the embodiments of the present disclosure, the first screen resolution of the first electronic device and the font size of the characters in the display content displayed by the first electronic device may be combined. In this way, the scaling ratio of the display content needed to enable the second electronic device to output the characters of the target font size under the second screen resolution of the second electronic device can be calculated to obtain the increase range of DPI of the first electronic device, that is, the reference increase range.

The following is an example of a calculation method of the reference increase range.

In some embodiments, the following formula can be used to calculate the reference increase range of DPI:

Reference increase range=((first screen resolution/second screen resolution)*target font size)/font size of the characters displayed by the data sharing party     Formula 1

In some embodiments, the font size of the characters displayed by the data sharing party may also be the font size of the characters in the display content displayed on the first electronic device determined in the process at 302.

For example, assume that the first screen resolution of the first electronic device is 2560*1400, the font size of the characters in the display content displayed by the first electronic device is 10.5 points, the second screen resolution of the second electronic device is 1920*1080, and the target font size is 8 points. Based on this, the calculated reference increase range based on Formula 1 is 132%.

In some embodiments, the first screen resolution may be the current screen resolution of the first electronic device, or the highest screen resolution of the first electronic device. Correspondingly, the second screen resolution may also be the current screen resolution of the first electronic device, or the highest screen resolution of the second electronic device.

At S304, determining the target increase range of DPI needed by the first electronic device based on the reference increase range.

In some embodiments, the target increase range may be the needed increase range for the second electronic device to display characters with a font size not lower than the target font size.

In some embodiments, the reference increase range may be determined as the target increase range of DPI.

In some embodiments, the first electronic device may be configured to include a plurality of selectable DPI range levels (or alternative candidate DPI increase range). In this way, the target increase range may be determined based on the DPI range level closest to the reference increase range.

For example, assume that the selectable DPI increase range of the first electronic device includes: 100%, 150%, 175%, 200%, and 225%, and the reference increase range is 132%, then the target DPI increase range can be determined to be 150%.

At S305, adjusting the increase range of DPI in the first electronic device based on the target increase range of DPI to adjust the display effect of the display content displayed by the first electronic device.

In some embodiments, after adjusting the increase range of DPI of the first electronic device to the target increase range, the display content displayed by the first electronic device may be enlarged, such that the characters in the display content may be enlarged, and the font size of the characters may increase, such that the characters can reach the target font size.

For details of the process at 305, reference can be made relevant description in the foregoing embodiments, which will not be repeated here.

The process at 305 is also explained by adjusting the DPI of the first electronic device to change the display effect of the display content displayed by the first electronic device. However, in the embodiments of the present disclosure, it is also possible not to adjust the DPI increase range of the first electronic device, but only based on the display content currently being displayed by the first electronic device, to construct the display content displayed when the DPI increase range is the target increase range to obtain the adjusted display content, but keeping the display effect of the display content displayed by the first electronic device unchanged.

At S306, sending the display content after the display effect adjustment to the second electronic device as the shared data.

In the embodiments of the present disclosure, before sending the display content as the shared data to the second electronic device, the first electronic device may be configured to determine a target increase range of DPI needed to enable the second electronic device to display characters with a font size not lower than the target font size based on the font size of the characters in the display content displayed on the first electronic device, the screen resolution of the first electronic device, the screen resolution of the second electronic device, and the target font size of the characters expected to be displayed on the second electronic device. Since the target font size may be the minimal font size at which the user can clearly view the characters, after adjusting the DPI of the first electronic device based on the target increase range of DPI, the font size of the characters in the display content displayed by the first electronic device may be changed, such as enlarged. Based on this, sending the adjusted display content to the second electronic device can make the font size of the character displayed by the second electronic device reach the target font size, thereby mitigating the situation of blurry characters due to the font size of the characters displayed on the second electronic device being too small.

The above description is based on the second electronic device serving as the recipient of the shared data as an example. In practical applications, there may be a plurality of second electronic devices as the shared data recipients at the same time. In this case, in the embodiments of the present disclosure, a target display parameter may be determined for each second electronic device based on the screen resolution of the second electronic device, the screen resolution of the first electronic device, and the first object attribute of the display object in the display content displayed on the first electronic device. Based on this, the target display parameters corresponding to the plurality of second electronic devices may be combined to comprehensively determine the final target display parameter.

For example, for each second electronic device, a target increase range of DPI may be determined, and then the largest target increase range may be selected as the final target increase range of DPI.

In order to facilitate the understanding of the technical solutions of the present disclosure, the technical solutions of the present disclosure will be described below in combination with a specific implementation method by taking a plurality of second electronic devices as the data sharing parties and taking the target object as a character as an example.

Figure 4:
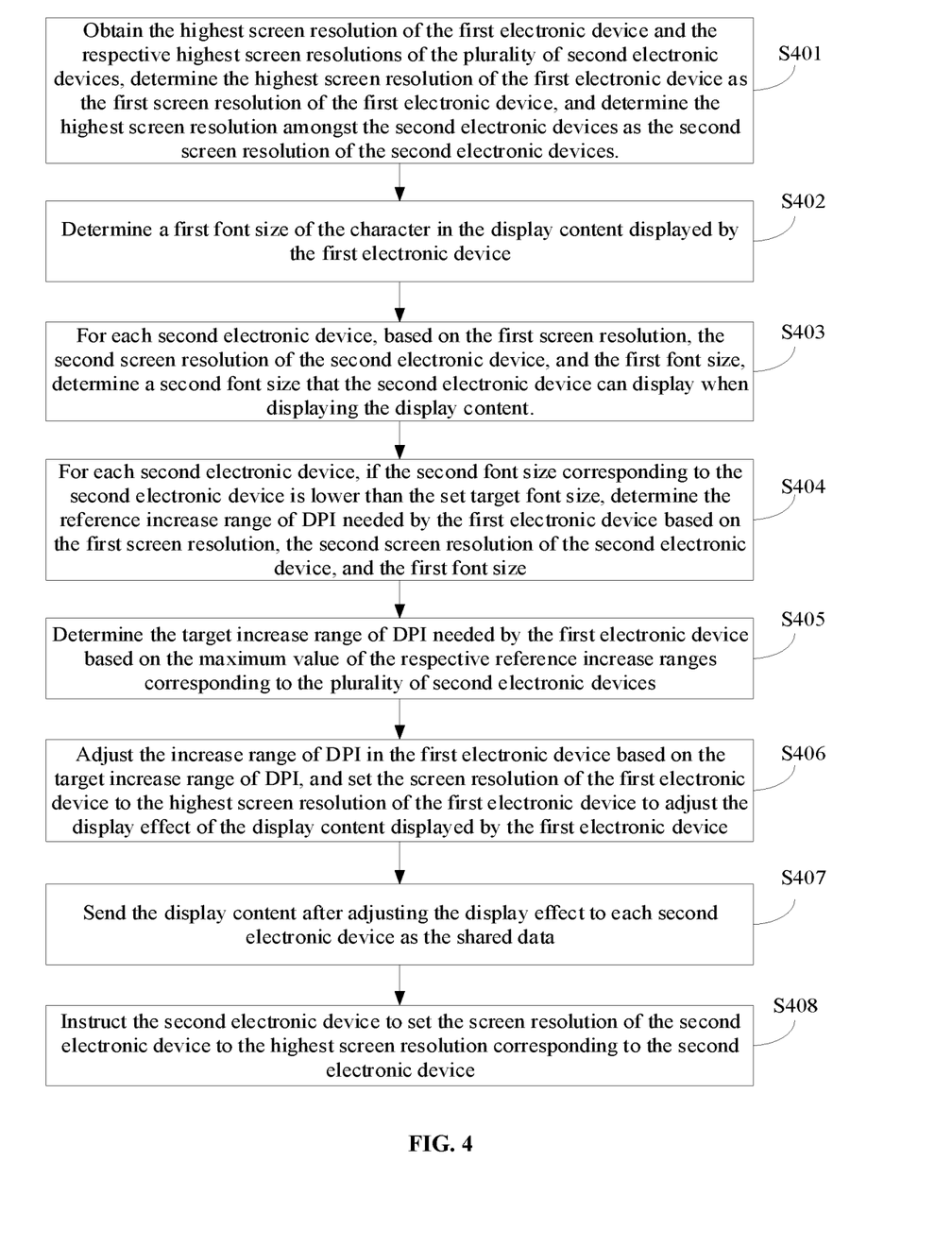
FIG. 4 is another schematic flowchart of the processing method according to an embodiment of the present disclosure.

FIG. 4 is another schematic flowchart of the processing method according to an embodiment of the present disclosure. The processing method of this embodiment can be applied to the first electronic device. The method will be described in detail below.

At S401, obtaining the highest screen resolution of the first electronic device and the respective highest screen resolutions of the plurality of second electronic devices, determining the highest screen resolution of the first electronic device as the first screen resolution of the first electronic device, and determining the highest screen resolution amongst the second electronic devices as the second screen resolution of the second electronic devices.

In some embodiments, the first electronic device may be the electronic device sending the shared data, and the plurality of second electronic devices may be the recipient of the shared data.

This embodiment is being described by taking the screen resolutions of the first electronic device and the second electronic devices as highest screen resolutions as an example. However, the same principle applies when the first screen resolution is the current screen resolution of the first electronic device or the second screen resolution is the current screen resolution of the second electronic device.

At S402, determining a first font size of the character in the display content displayed by the first electronic device.

At S403, for each second electronic device, based on the first screen resolution, the second screen resolution of the second electronic device, and the first font size, determining a second font size that the second electronic device can display when displaying the display content.

For ease of distinction, the font size characterized by the display content current displayed by the first electronic device may be referred to as the first font size, and the font size characterized by the second electronic device to display the display content may be referred to as the second font size.

In some embodiments, the second font size may be calculated in combination with the conversion relationship between screen resolutions and font sizes of different electronic devices. For example, based on research, it is found that the screen resolution and font size of two electronic devices satisfy Formula 2 below. Based on this, the second font size can be calculated based on Formula 2.

Second font size=first font size/(first screen resolution/second screen resolution)    Formula 2

For example, the first screen resolution of the first electronic device is 2560*1400, the first font size of the characters in the display content displayed by the first electronic device is 10.5 points, and the second screen resolution of the second electronic device is 1920*1080. Based on Formula 2, after the second electronic device displays the display content currently being displayed by the first electronic device, the characters in the display content displayed by the second electronic device have a second font size of 6.1 points.

At S404, for each second electronic device, if the second font size corresponding to the second electronic device is lower than the set target font size, determining the reference increase range of DPI needed by the first electronic device based on the first screen resolution, the second screen resolution of the second electronic device, and the first font size.

In some embodiments, the target font size may be the minimum font size that the electronic device can clearly display characters, or the minimum font size of characters that the second electronic device needs to display.

As described above, the target font size may be set to 8 points. Correspondingly, if the second font size is less than 8 points, it may indicate that after the content currently being displayed by the first electronic device is assigned to the second electronic device as the screen sharing content or other forms of shared data, the characters in the display content displayed by the second electronic device will be blurry.

For example, assume that user A is the user of the sender of the shared data (that is, the sharing party of the shared data), and the user A needs to share the content being displayed by the display of an electronic device A with five other users through the electronic device A. Further, assume that the screen resolution of user A is 2560*1400, and the first font size of the characters displayed on the first electronic device is 10.5 points. Furthermore, assume that the five users who are recipients of the shared data are user B, user C, user D, user E, and user F, and the screen resolutions of the second electronic devices of these five users are as follow: screen resolution of user B: 1920*1080; screen resolution of user c: 1280*1024; screen resolution of user D: 2560*1440; screen resolution of user E: 4096*2160; and screen resolution of user F: 1024*768.

Assume that he first electronic device shares the currently displayed display content with these five users respectively, the second font size of the characters in the display content displayed by user B to user F can be respectively calculated, and the obtained second font size corresponding to the electronic devices of user B, user C, and user F is less than 8 points. Therefore, the electronic devices of these three users cannot clearly display the display content shared by the first electronic device.

Based on this, there is a need to set the highest screen resolution for the second electronic devices of user B, user C, and user F, and calculate the reference increase range of DPI needed by the first electronic device.

For the calculation method of the reference increase range, reference can be made to the relevant description of the foregoing embodiments, for example, Formula 1 may be used to perform the calculation, but the present disclosure is not limited thereto.

At S405, determining the target increase range of DPI needed by the first electronic device based on the maximum value of the respective reference increase ranges corresponding to the plurality of second electronic devices.

In some embodiments, the maximum value among the reference increase ranges corresponding to the second electronic devices may be determined as the target increase range of DPI of the first electronic device.

In some embodiments, the target increase range of DPI may be determined based on the maximum value of the reference increase range corresponding to each of the plurality of second electronic devices and the selectable DPI increase ranges in the first electronic device.

Continue with the example in the process at 404. Based on the highest screen resolutions corresponding to the second electronic devices of user B, user C, and user F, respectively, the reference increase ranges may be calculated as follow:

For user B, the target increase range of DPI needed by user A's electronic device may be: ((2560*1400)/(1920*1080)*8)/10.5≈132%.

For user C, the target increase range of DPI needed by user A's electronic device may be: ((2560*1400)/(1280*1024)*8)/10.5≈208%.

For user F, the target increase range of DPI needed by user A's electronic device may be: ((2560*1400)/(1024*768)*8)/10.5≈347%.

The maximum value of the reference increase range in DPI calculated for the three shared data recipient is 347%. However, since 347% exceeds the highest increase range of 225% of the DPI on the first electronic device as the sender of the shared data, the target increase range of DPI needed by the first electronic device may be set as 225%.

At S406, adjusting the increase range of DPI in the first electronic device based on the target increase range of DPI, and setting the screen resolution of the first electronic device to the highest screen resolution of the first electronic device to adjust the display effect of the display content displayed by the first electronic device.

At S407, sending the display content after adjusting the display effect to each second electronic device as the shared data.

At S408, instructing the second electronic device to set the screen resolution of the second electronic device to the highest screen resolution corresponding to the second electronic device.

In some embodiments, the process at 408 may be performed synchronously in Step S407.

Since the screen resolution of some second electronic devices may be higher than the screen resolution of the first electronic device, even if the screen resolution is not adjusted, the characters may still be clearly displayed. Therefore, the process at 408 may only send an instruction to adjust the screen resolution to the second electronic devices whose second font size is smaller than the target font size.

In embodiments of the present disclosure, after the increase range of DPI of the first electronic device is adjusted, a reminder that the shared data has been optimized may also be output on the first electronic device. The reminder that the shared data has been optimized may be used to remind the user that clarity optimization of the shared data has been performed for a shared data recipient whose display object is unclear.

Further, while outputting the reminder that the shared data has been optimized, a DPI manual adjustment bar may also be displayed. The DPI manual adjustment bar may be used for users to manually adjust the DPI increase range to support users to manually adjust the DPI increase range based on actual needs.

Corresponding to the processing method of the present disclosure, an embodiment of the present disclosure also provides a processing device.

Figure 5:
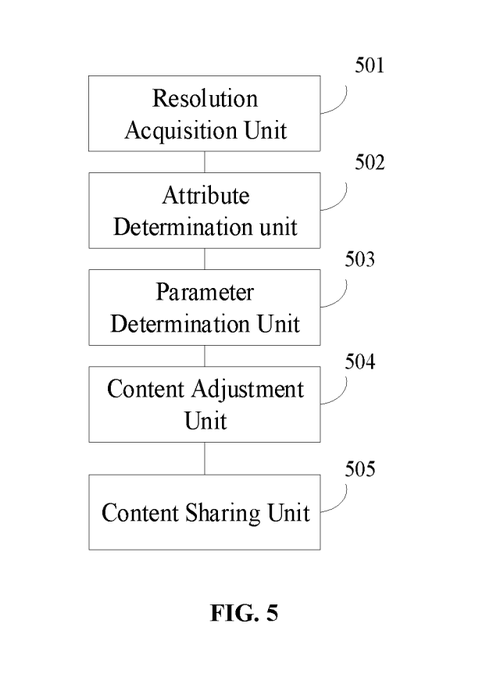
FIG. 5 is a schematic structural diagram of a processing device according to an embodiment of the present disclosure.

FIG. 5 is a schematic structural diagram of a processing device according to an embodiment of the present disclosure. The processing device can be applied to the first electronic device.

As shown in FIG. 5, the processing device includes a resolution acquisition unit 501, an attribute determination unit 502, a parameter determination unit 503, a content adjustment unit 504, and a content sharing unit 505.

The resolution acquisition unit 501 may be configured to obtain the first screen resolution of the first electronic device and the second screen resolution of the second electronic device. In some embodiments, the first electronic device may be the sender of the shared data, and the second electronic device may be the recipient of the shared data.

The attribute determination unit 502 may be configured to determine the first display attribute of the display object in the display content displayed by the first electronic device. The first display attribute may be at least used to characterize the display size displayed by the display object.

The parameter determination unit 503 may be configured to determine the target display parameter based on the first screen resolution, the second screen resolution, and the first display attribute. The target display parameter may be a display parameter needed to enable the second electronic device to display the display object with the target display attribute.

The content adjustment unit 504 may be configured to adjust the display effect of the display content based on the target display parameter for the display object in the display content to include the target display attribute.

The content sharing unit 505 may be configured to send the display content to the second electronic device as the shared data after the display effect is adjusted.

In some embodiments, the content adjustment unit may include a first content adjustment unit or a second content adjustment unit. The first content adjustment unit may be configured to adjust the display parameter of the first electronic device based on the target display parameter to adjust the display effect of the display content. The second content adjustment unit may be configured to adjust the display content to a display effect under the target display parameter to obtain the display content after the display effect is adjusted.

In some embodiments, the parameter determination unit may include a parameter determination subunit. The parameter determination subunit may be configured to determine the target increase range in DPI of the first electronic device based on the first screen resolution, the second screen resolution, and the first display attribute.

In some embodiments, the attribute determination unit may include a character determination unit. The character determination unit may be configured to determine the font size of the characters in the display content displayed by the first electronic device. In some embodiments, the parameter determination subunit may include a range determination subunit. The range determination subunit may be configured to determine the target increase range of DPI of the first electronic device based on the first screen resolution, the second screen resolution, and the font size.

In some embodiments, the range determination subunit may include a reference determination subunit. The reference determination subunit may be configured to determine the reference increase range of DPI needed by the first electronic device based on the first screen resolution, the second screen resolution, the font size, and the target font size, the reference increase range being the increase range of DPI needed for the second electronic device to display the characters in the display content at a font size now lower than the target font size. The range determination subunit may further include a target range determination subunit. The target range determination subunit may be configured to determine the target increase range of DPI of the first electronic device based on the reference increase range.

In some embodiments, the resolution acquisition unit obtaining the second screen resolution of the second electronic device may include obtaining the respective second screen resolutions of a plurality of second electronic devices. The target range determination subunit may be configured to determine the maximum value of the reference increase range corresponding to each of the plurality of second electronic devices as the target increase range of DPI of the first electronic device.

In some embodiments, the second screen resolution of the second electronic device obtained by the resolution acquisition unit may be the highest screen resolution of the second electronic device.

In some embodiments, the processing device may further include a resolution instructing unit. The resolution instructing unit may be configured to instruct the second electronic device to set the screen resolution of the second electronic device to the highest screen resolution corresponding to the second electronic device when the content sharing unit sends the display content after adjusting the display effect to the second electronic device as the shared data.

In some embodiments, the processing device may further include a reference attribute determination unit. The reference attribute determination unit may be configured to determine the second display attribute of the display object based on the first screen resolution, the second screen resolution, and the first display attribute when the second electronic device outputs the display content before the parameter determination unit determines the target display parameter. In some embodiments, the parameter determination unit may be configured to determine the target display parameter needed by the first electronic device based on the first screen resolution, the second screen resolution, and the first display attribute if the display size characterized by the second target display attribute is lower than the display size characterized by the target display attribute.

Figure 6:
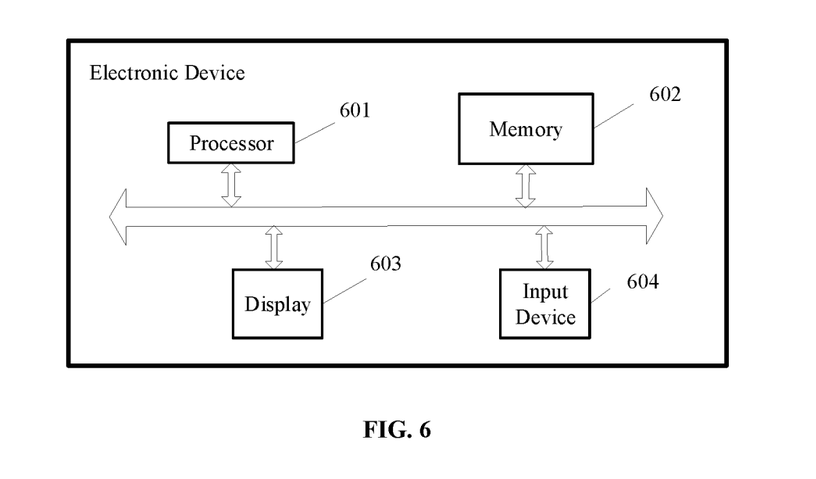
FIG. 6 is a schematic structural diagram of an electronic device according to an embodiment of the present disclosure.

The present disclosure also provides an electronic device. FIG. 6 is a schematic structural diagram of an exemplary electronic device according to some embodiments of the present disclosure. The electronic device may be any type of electronic device. As shown in FIG. 6, the electronic device includes at least a processor 601 and a memory 602. The processor 601 is configured to perform the processing method in any one of the above-described embodiments. The memory 602 is used to store programs required by the processor to perform operations.

In some embodiments, the electronic device further includes a display 603 and an input device 604. In some other embodiments, the electronic device may include more or less components shown in FIG. 6, which are not limited thereto.

The present disclosure also provides a computer-readable storage medium. The computer-readable storage medium stores at least one instruction, at least one section of a program, a code set or an instruction set. The at least one instruction, at least one section of the program, the code set or the instruction set will be loaded and executed by a processor to implement the processing method described in any one of the above-described embodiments.

The present disclosure also provides a computer program. The computer program includes computer instructions. The computer instructions may be stored in the computer-readable storage medium. The computer program is executed by an electronic device to perform the image display method described in any one of the above-described embodiments.

Various embodiments in the specification are described in a progressive manner, and each embodiment focuses on the differences from other embodiments, and for the same and similar parts between the various embodiments, reference can be made to each other. At the same time, the features described in the embodiments in the specification may be replaced or combined with each other, such that those skilled in the art can realize or use the present disclosure. As for the devices disclosed in the embodiments, because of the correspondence to the method disclosed in the embodiments, the description is relatively simple, and reference can be made to the description of the method for relevant parts.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . ." does not preclude the presence of additional identical elements in a process, method, article or apparatus that includes the element.

The above description of the disclosed embodiments enables those skilled in the art to implement or use this application. Various modifications to these embodiments will be obvious to those skilled in the art, and the general principles defined herein can be implemented in other embodiments without departing from the spirit or scope of the present application. Therefore, this application will not be limited to the embodiments shown in the specification, but should conform to the broadest scope consistent with the principles and novelties disclosed in the specification.

The above are only preferred embodiments of the present disclosure and do not limit the scope of this application. Any equivalent structure or equivalent process transformation made using the content of the description and drawings of the disclosure, or directly or indirectly used in other related technical fields are also included in the scope of patent protection of the present disclosure.

What is claimed is:

1. A processing method comprising:
   obtaining a first screen resolution of a first electronic device and a second screen resolution of a second electronic device, the first electronic device being a sender of shared data, and second electronic device being a recipient of the shared data;
   determining a first display attribute of a display object in display content displayed by the first electronic device, the first display attribute being at least used to characterize a display size represented by the display object;
   determining a target display parameter including a target increase range of dots per inch (DPI) of the first electronic device, based on the first screen resolution, the second screen resolution, and the first display attribute, the target display parameter being a display parameter needed for the second electronic device to display the display object with a target display attribute;
   adjusting display effect of the display content displayed by the first electronic device based on the target display parameter; and
   sending the display content after adjusting the display effect to the second electronic device as the shared data, wherein determining the target increase range of the DPI of the first electronic device based on the first screen resolution, the second screen resolution, and the first display attribute includes:
   determining a reference increase range of the DPI needed by the first electronic device based on the first screen resolution, the second screen resolution, and the first display attribute, the reference increase range of the DPI being an increase range of DPI needed for the second electronic device to display the display object in the display content at the display size not lower than a target size of the display object;
   determining a plurality of selectable DPI ranges of the first electronic device; and
   determining the target increase range of the DPI according to the plurality of selectable DPI ranges, including:
      in response to determining that the reference increase range of the DPI is greater than a maximum increase range of DPI, set in the first electronic device, that is included in the plurality of selectable DPI ranges, determining the target increase range of the DPI as the maximum increase range of DPI; or
      in response to determining that the reference increase range of the DPI is less than a current increase range of DPI that is included in the plurality of selectable DPI ranges, determining the target increase range of the DPI as the current increase range of DPI.

2. The processing method of claim 1, wherein adjusting the display effect of the display content based on the target display parameter includes:
   adjusting the display parameter of the first electronic device based on the target display parameter to adjust the display effect of the display content; or
   adjusting the display content to the display effect under the target display parameter to obtain the display content after the display effect is adjusted.

3. The processing method of claim 1, wherein:
   determining the first display attribute of the display object in the display content displayed by the first electronic device, includes:
      determining a font size of characters in the display content displayed by the first electronic device; and
   determining the reference increase range of the DPI based on the first screen resolution, the second screen resolution, and the first display attribute includes:
      determining the reference increase range of the DPI based on the first screen resolution, the second screen resolution, and the font size.

4. The processing method of claim 3, wherein:
   the font size is a first font size;
   the target size of the display object is a set target font size, and the display size is a second font size; and
   determining the reference increase range of the DPI based on the first screen resolution, the second screen resolution, and the font size includes:
      determining the reference increase range of the DPI based on the first screen resolution, the second screen resolution, the first font size, and the set target font size, the reference increase range being an increase range of DPI needed for the second electronic device to display the characters in the display content at the second font size not lower than the set target font size.

5. The processing method of claim 4, wherein:
obtaining the second screen resolution of the second electronic device includes:
obtaining second screen resolutions of a plurality of second electronic devices, respectively; and
determining the target increase range of the DPI of the first electronic device further includes:
determining a maximum value among the reference increase ranges corresponding to each of the plurality of second electronic devices as the target increase range of the DPI of the first electronic device.

6. The processing method of claim 1, wherein obtaining the second screen resolution of the second electronic device includes:
obtaining a highest screen resolution of the second electronic device, and determining the highest screen resolution of the second electronic device as the screen resolution of the second electronic device.

7. The processing method of claim 6, wherein sending the display content after adjusting the display effect to the second electronic device as the shared data further includes:
instructing the second electronic device to set the screen resolution of the second electronic device to the highest screen resolution corresponding to the second electronic device.

8. The processing method of claim 1, further comprising, before determining the target display parameter:
determining a second display attribute of the display object when the second electronic device outputs the display content based on the first screen resolution, the second screen resolution, and the first display attribute; and
determining the target display parameter needed by the first electronic device based on the first screen resolution, the second screen resolution, and the first display attribute if the display size characterized by the second electronic device is lower than the display size characterized by the target display attribute.

9. A processing device comprising a processor configured to:
obtain a first screen resolution of a first electronic device and a second screen resolution of a second electronic device, the first electronic device being a sender of shared data, and the second electronic device being a recipient of the shared data;
determine a first display attribute of a display object in display content displayed by the first electronic device, the first display attribute being at least used to characterize a display size displayed by the display object;
determine a target display parameter including a target increase range of dots per inch (DPI) of the first electronic device, based on the first screen resolution, the second screen resolution, and the first display attribute, the target display parameter being a display parameter needed for the second electronic device to display the display object with a target display attribute;
adjust display effect of the display content displayed by the first electronic device based on the target display parameter for the display object in the display content to include the target display attribute; and
send the display content after adjusting the display effect to the second electronic device as the shared data,
wherein determining the target increase range of the DPI of the first electronic device based on the first screen resolution, the second screen resolution, and the first display attribute includes:
determining a reference increase range of the DPI needed by the first electronic device based on the first screen resolution, the second screen resolution, and the first display attribute, the reference increase range of the DPI being an increase range of DPI needed for the second electronic device to display the display object in the display content at the display size not lower than a target size of the display object;
determining a plurality of selectable DPI ranges of the first electronic device; and
determining the target increase range of the DPI according to the plurality of selectable DPI ranges, including:
in response to determining that the reference increase range of the DPI is greater than a maximum increase range of DPI, set in the first electronic device, that is included in the plurality of selectable DPI ranges, determining the target increase range of the DPI as the maximum increase range of DPI; or
in response to determining that the reference increase range of the DPI is less than a current increase range of DPI that is included in the plurality of selectable DPI ranges, determining the target increase range of the DPI as the current increase range of DPI.

10. The processing device of claim 9, wherein the processor is further configured to:
adjust the display parameter of the second electronic device based on the target display parameter to adjust the display effect of the display content, or
adjust the display content to the display effect under the target display parameter to obtain the display content after the display effect is adjusted.

11. The processing device of claim 9, wherein the processor is further configured to:
determine a font size of characters in the display content displayed by the first electronic device; and
determine the reference increase range of DPI based on the first screen resolution, the second screen resolution, and the font size.

12. The processing device of claim 11, wherein:
the font size is a first font size;
the target size of the display object is a set target font size, and the display size is a second font size; and
the processor is further configured to:
determine the reference increase range of DPI needed by the first electronic device based on the first screen resolution, the second screen resolution, the first font size, and the set target font size, the reference increase range being an increase range of DPI needed for the second electronic device to display the characters in the display content at the second font size not lower than the set target font size.

13. The processing device of claim 12, wherein the processor is further configured to:
obtain respective second screen resolutions of a plurality of second electronic devices; and
determine a maximum value among the reference increase ranges corresponding to each of the plurality of second electronic devices as the target increase range of DPI of the first electronic device.

14. The processing device of claim 9, wherein the processor is further configured to:
obtain a highest screen resolution of the second electronic device, and determine the highest screen resolution of the second electronic device as the screen resolution of the second electronic device.

15. The processing device of claim 14, wherein the processor is further configured to:
instruct the second electronic device to set the screen resolution of the second electronic device to the highest screen resolution corresponding to the second electronic device.

16. The processing device of claim 9, wherein the processor is further configured to:
determine a second display attribute of the display object when the second electronic device outputs the display content based on the first screen resolution, the second screen resolution, and the first display attribute, and
determine the target display parameter needed by the first electronic device based on the first screen resolution, the second screen resolution, and the first display attribute if the display size characterized by the second electronic device is lower than the display size characterized by the target display attribute.

17. A non-transitory computer-readable storage medium containing computer-executable instructions that, when executed by a processor, causes the processor to:
obtain a first screen resolution of a first electronic device and a second screen resolution of a second electronic device, the first electronic device being a sender of shared data, and second electronic device being a recipient of the shared data;
determine a first display attribute of a display object in display content displayed by the first electronic device, the first display attribute being at least used to characterize display size displayed by the display object;
determine a target display parameter including a target increase range of dots per inch (DPI) of the first electronic device, based on the first screen resolution, the second screen resolution, and the first display attribute, the target display parameter being a display parameter needed for the second electronic device to display the display object with the target display attribute;
adjust display effect of the display content displayed by the first electronic device based on the target display parameter; and
send the display content after adjusting the display effect to the second electronic device as the shared data,
wherein determining the target increase range of the DPI of the first electronic device based on the first screen resolution, the second screen resolution, and the first display attribute includes:
determining a reference increase range of the DPI needed by the first electronic device based on the first screen resolution, the second screen resolution, and the first display attribute, the reference increase range of the DPI being an increase range of DPI needed for the second electronic device to display the display object in the display content at the display size not lower than a target size of the display object;
determining a plurality of selectable DPI ranges of the first electronic device; and
determining the target increase range of the DPI according to the plurality of selectable DPI ranges, including:
in response to determining that the reference increase range of the DPI is greater than a maximum increase range of DPI, set in the first electronic device, that is included in the plurality of selectable DPI ranges, determining the target increase range of the DPI as the maximum increase range of DPI; or
in response to determining that the reference increase range of the DPI is less than a current increase range of DPI that is included in the plurality of selectable DPI ranges, determining the target increase range of the DPI as the current increase range of DPI.

18. The non-transitory computer-readable storage medium of claim 17, wherein the computer-executable instructions further cause the processors to:
adjust the display parameter of the first electronic device based on the target display parameter to adjust the display effect of the display content; or,
adjust the display content to the display effect under the target display parameter to obtain the display content after the display effect is adjusted.

* * * * *